(12) United States Patent
Shinn et al.

(10) Patent No.: US 10,939,494 B2
(45) Date of Patent: Mar. 2, 2021

(54) BEARER PREFERENCE IN A COMBINED SMART-MIC AND LMR RADIO

(71) Applicant: TAIT INTERNATIONAL LIMITED, Christchurch (NZ)

(72) Inventors: Tong-Wook Shinn, Christchurch (NZ); Aritra Das, Christchurch (NZ); Robert James Melchers, Christchurch (NZ); Niall McAndrew, Christchurch (NZ); Clive Douglas Horn, Christchurch (NZ)

(73) Assignee: TAIT INTERNATIONAL LIMITED, Christchurch (NZ)

( * ) Notice: Subject to any disclaimer, the term of this patent is extended or adjusted under 35 U.S.C. 154(b) by 0 days.

(21) Appl. No.: 16/720,118

(22) Filed: Dec. 19, 2019

(65) Prior Publication Data

US 2020/0205222 A1 Jun. 25, 2020

Related U.S. Application Data (60) Provisional application No. 62/781,642, filed on Dec. 19, 2018.

(51) Int. Cl.
*H04W 76/45* (2018.01)
*H04W 76/16* (2018.01)
*H04W 88/06* (2009.01)

(52) U.S. Cl.
CPC ........... *H04W 76/45* (2018.02); *H04W 76/16* (2018.02); *H04W 88/06* (2013.01)

(58) Field of Classification Search
CPC ... H04W 4/10; H04W 36/0027; H04W 36/28; H04W 76/15; H04W 76/16; H04W 76/45; H04W 88/06
See application file for complete search history.

(56) References Cited

U.S. PATENT DOCUMENTS

| | | | |
|---|---|---|---|
| 10,015,658 B1 | 7/2018 | Alfaro et al. | |
| 10,341,839 B2 | 7/2019 | Alfaro et al. | |
| 2007/0171894 A1* | 7/2007 | Han | H04W 88/06 370/352 |
| 2008/0285487 A1* | 11/2008 | Forslow | H04L 65/4061 370/277 |
| 2013/0044710 A1 | 2/2013 | Martinez et al. | |
| 2015/0207910 A1* | 7/2015 | Tennant | H04W 52/38 455/418 |
| 2015/0350090 A1* | 12/2015 | Peck | H04W 4/90 455/404.1 |

\* cited by examiner

*Primary Examiner* — Raymond S Dean
(74) *Attorney, Agent, or Firm* — Ladas & Parry LLP; Malcolm J. MacDonald (57) ABSTRACT

A combined cellular smart-mic and LMR radio terminal is operated to give preference to one wireless bearer over the other. A voice call is often received both on the cellular bearer and the LMR bearer. It is then determined if the cellular or LMR bearer is preferred for calls. The call continues on the preferred bearer only while the same call on the non-preferred bearer is discontinued. The non-preferred call can be muted, disabled or ended for example. The preferred bearer may be determined by signal quality, user location, network priority or user settings, for example.

9 Claims, 13 Drawing Sheets

BEARER PREFERENCE IN A COMBINED SMART-MIC AND LMR RADIO

FIELD OF THE INVENTION

This invention relates to Push to Talk (PTT) operation in a combined LMR and IP cellular communication system. More particularly this invention relates to the operations of a multi-bearer terminal that use both PTToC (PTT over Cellular) and LMR and methods by which voice or data messages are selected.

BACKGROUND TO THE INVENTION

Land Mobile Radio (LMR) systems traditionally support PTT operation in half duplex. This means that a radio terminal or smart mic can either transmit or receive but not do so simultaneously. PTT solutions that operate over Internet Protocol (IP) are commonly referred to as Voice Over Internet Protocol (VOIP) solutions. Some VOIP solutions are implemented as half duplex. Other VOIP solutions are implemented in full duplex which means a radio terminal or smart mic can receive and transmit simultaneously.

LMR is a technology that supplies PTT voice service but operates over communication technology specifically optimized for voice. Examples of LMR technology include but are or not limited to P25 (APCO 25), Tetra, DMR (Digital Mobile Radio), or analogue LMR. LMR PTT voice service typically operates using an LMR server that forms a central controller to which all the LMR radios connect to for service. Generally LMR voice services are half duplex.

Push To Talk over Cellular (PTToC) solutions are used by professional users such as security guards for voice communication. The technology typically uses a PTToC server deployed either locally or on the cloud and multiple PTToC clients connect to the server for operations. Typically the PTToC clients operate on smart phones using the cellular network for communications and the voice service supplied is either half duplex or full duplex. More generally the technology is referred to as VOIP because the voice service can run over any suitable IP network such as Wi-Fi as well as cellular.

Today, professional users such as police, fire and ambulance tend to use a combination of LMR and PTToC technologies. Unique integration problems are created when LMR and PTToC technologies are combined.

When a combined LMR/PTToC terminal receives a call, the same call can arrive via the two different communications paths. If an audio call is received via two separate paths then a user could hear two separate versions of the audio which are likely to be slightly delayed compared to one another. This makes it very difficult for the user to interpret the received audio. Solutions are required that prevent the user from hearing audio of the same call via both LMR and PTToC paths.

When a combined LMR/PTToC terminal receives a call on LMR and at the same time another call arrives on PTToC it means the user could experience the combination of two audio streams thereby creating confusion. Solutions are required that manage the case of receiving two separate calls at either the same time or nearly the same time.

Prior art solutions to the above problem focus on solutions in the server to detect that an LMR and PTToC device are connected and as such represent the same device. With such techniques the server can choose to establish a call via one bearer or another. There are many cases however where such intelligence in the network is not practical and as such, solutions are required at the combined LMR/PTToC device. One example of such a case is the combination of a PTToC system with an analog LMR system.

SUMMARY OF THE INVENTION

It is an object of the invention to provide a solution for a combined LMR/PTToC terminal in a situation where the same call is received via both LMR and PTToC In one aspect the invention resides in a method of operating a combined cellular smart-mic and LMR radio terminal. Steps of the method include: receiving a voice call on the cellular bearer, receiving the same call on the LMR bearer, determining at the smart-mic or the terminal if the cellular or LMR bearer is preferred for calls, and establishing or continuing with the call on the preferred bearer only.

The call can then be ignored or discontinued on the non-preferred bearer by muting, disabling or ending the call on the non-preferred bearer. The preferred bearer is determined by signal quality, user location, network priority or user settings, for example.

In another aspect the invention resides in a smart mic for combination with an LMR radio terminal. The smart mic includes a cellular radio for communication with a wireless network using a cellular bearer, and a speaker and microphone which provide for audio output and input during calls. A smart mic processor acts on instructions in a memory in order to: receive a call on the cellular bearer, determine when the call has also been received by the LMR radio terminal on an LMR bearer, determine whether the cellular bearer or the LMR bearer is preferred for calls, and continue with the call on the preferred bearer using the smart mic or LMR terminal.

The cellular bearer is typically LTE and the smart-mic is operating a PTToC client. LTE or Long Term Evolution is a registered trademark owned by ETSI (European Telecommunications Standards Institute) for wireless data communications technology and a development of the GSM/UMTS standards.

The system from which LMR bearer is originating can be any type of LMR including but not limited to P25 (APCO 25), Tetra, DMR (Digital Mobile Radio), or analogue LMR. The description of the LMR network described here is a trunked P25 network however the approach of switching between full duplex and half duplex in the PTT core is valid irrespective of the type of LMR network being connected to either trunked or conventional. In general it is the source considered to be a half duplex source.

LIST OF FIGURES

Preferred embodiments of the invention will be described with respect to the accompanying drawings, of which.

DESCRIPTION OF PREFERRED EMBODIMENTS

Referring to the drawings it will be appreciated the invention may be performed in a variety of ways, using many forms of combined LMR and PTToC system. Any kind of LMR may be used as a source of half duplex voice and many forms of PTToC or VOIP technology may be involved.

LMR systems can operate in two modes: trunked, where a central controller allocates a channel to the MR radio; or conventional, where the user selects the channel upon which to operate. Both forms of radio operation are included in the algorithms that follow. In this example, implementation is also based on a portable device comprising a smart mic and hand portable radio where the two devices are connected via wire. The same approach can be applied to a vehicle installation wherein the components of the radio and the processing capability of the smart mic are integrated into one device that may be portable or vehicle based.

Figure 1:
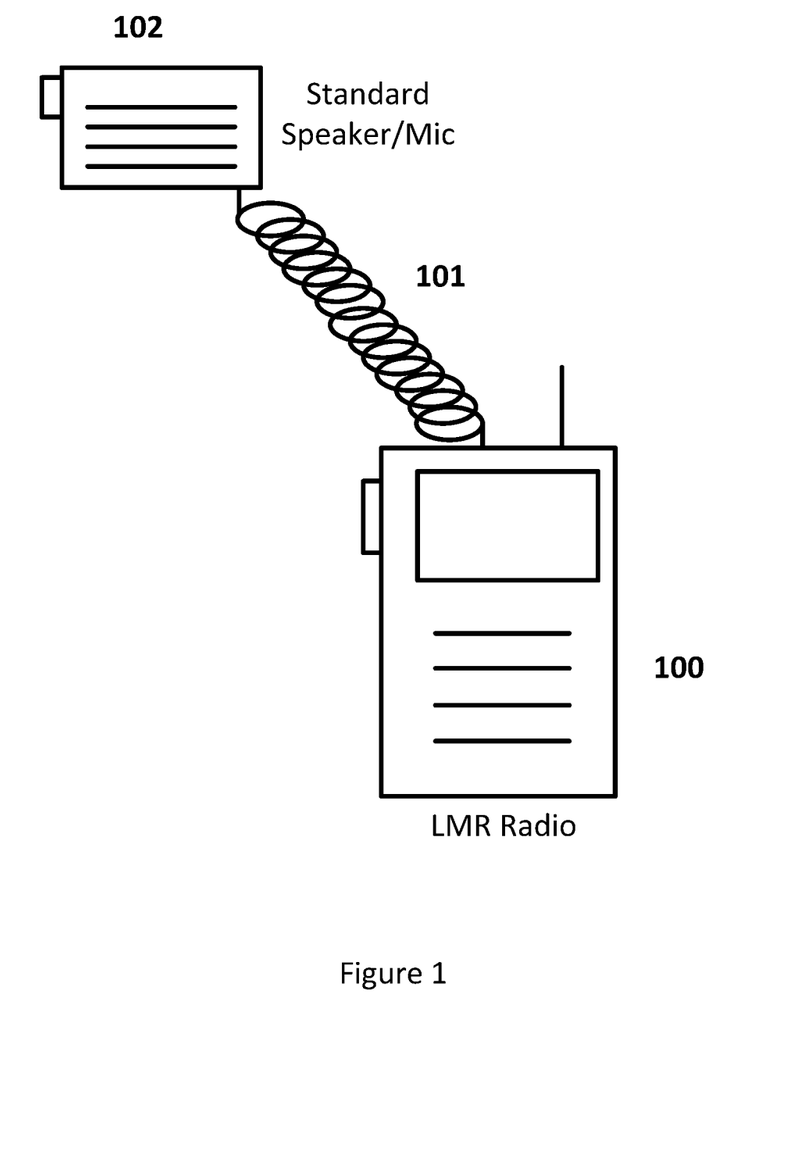
FIG. 1 shows a typical LMR radio terminal attached to a standard speaker/mic.

FIG. 1 shows a typical configuration of an LMR radio terminal 100 connected to a standard speaker mic device 102 through a cable 101. This is a common configuration used in the field today. For example a police officer may be wearing an LMR radio terminal 100 on a belt and a cable 101 may run up the body to a speaker mic 102 located on a lapel or another convenient position. The cable 101 typically carries audio signals and push to talk (PTT) signals although it can also carry digital signaling including bearer quality and control commands for the purpose of transferring information between the radio and an attached device. This type of speaker mic 102 typically has minimal processing capability and represents an extension of the functionality of the attached LMR radio terminal.

Figure 2:
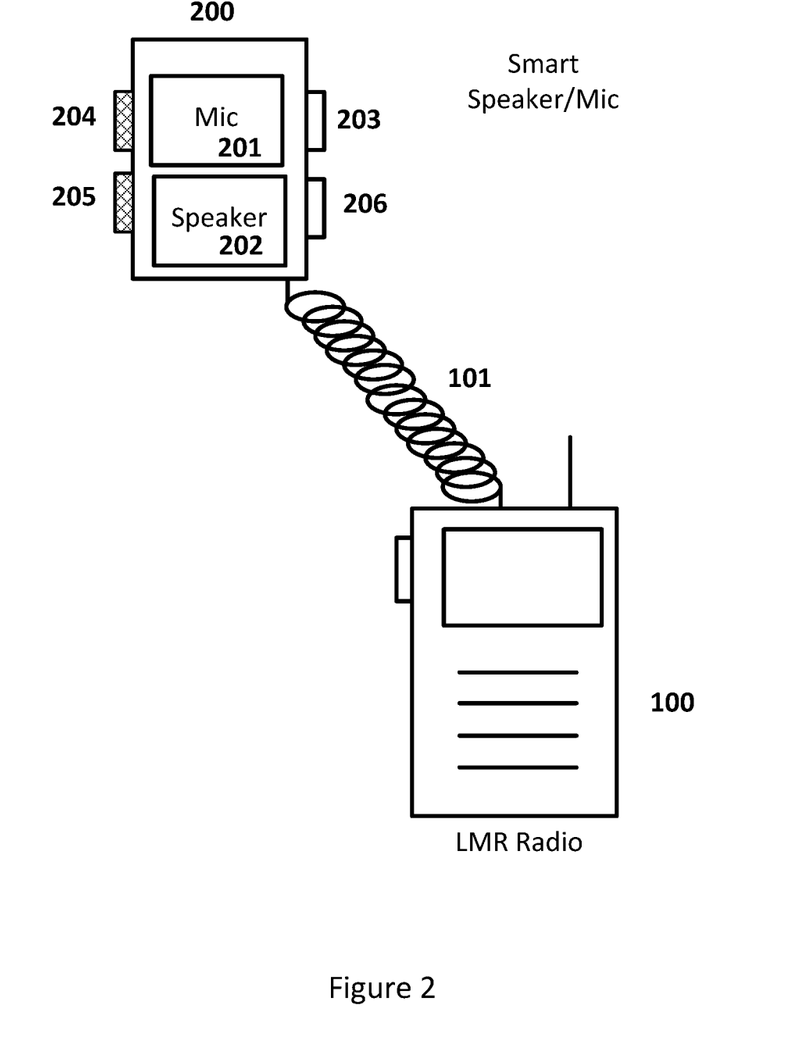
FIG. 2 shows a typical LMR radio terminal connected to a smart mic.

FIG. 2 shows a smart mic device 200. The smart mic contains its own processor. The smart mic is optionally connected to an LMR radio terminal 100 via a cable 101 that may be the same as that described in FIG. 1. The smart mic 200 also contains one or more microphones 201 and one or more speakers 202 and one or more function buttons. In this case two PTT buttons are shown 204 and 205 and two other buttons 203 and 206 represent general function buttons such as report location or emergency button. All the buttons are configurable. In a preferred embodiment the smart mic controls or operates both devices and enables both to receive calls simultaneously, on respective bearers, rather than just one bearer using one device or the other. The devices communicate with each other using a wired or wireless connection.

Figure 3:
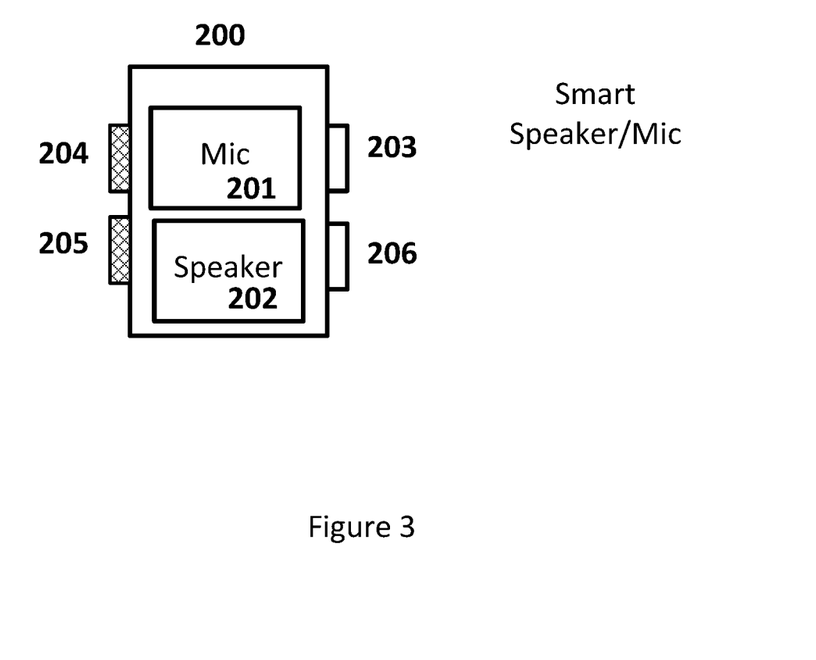
FIG. 3 shows a typical smart mic operating independently of the LMR radio terminal.

FIG. 3 shows a smart mic 200 in isolation to illustrate that as an accessory it can operate independently of the radio terminal. Loaded on the smart mic is a VOIP application. The application is configured such that one or more voice groups may exist (e.g one for local operations and one for dispatcher operations). Alternatively the application can support individual calls such that one smart mic user can contact one other smart mic user. This application normally operates in full duplex voice mode meaning the users of this smart mic and of other smart mics can talk and listen at the same time.

Figure 4:
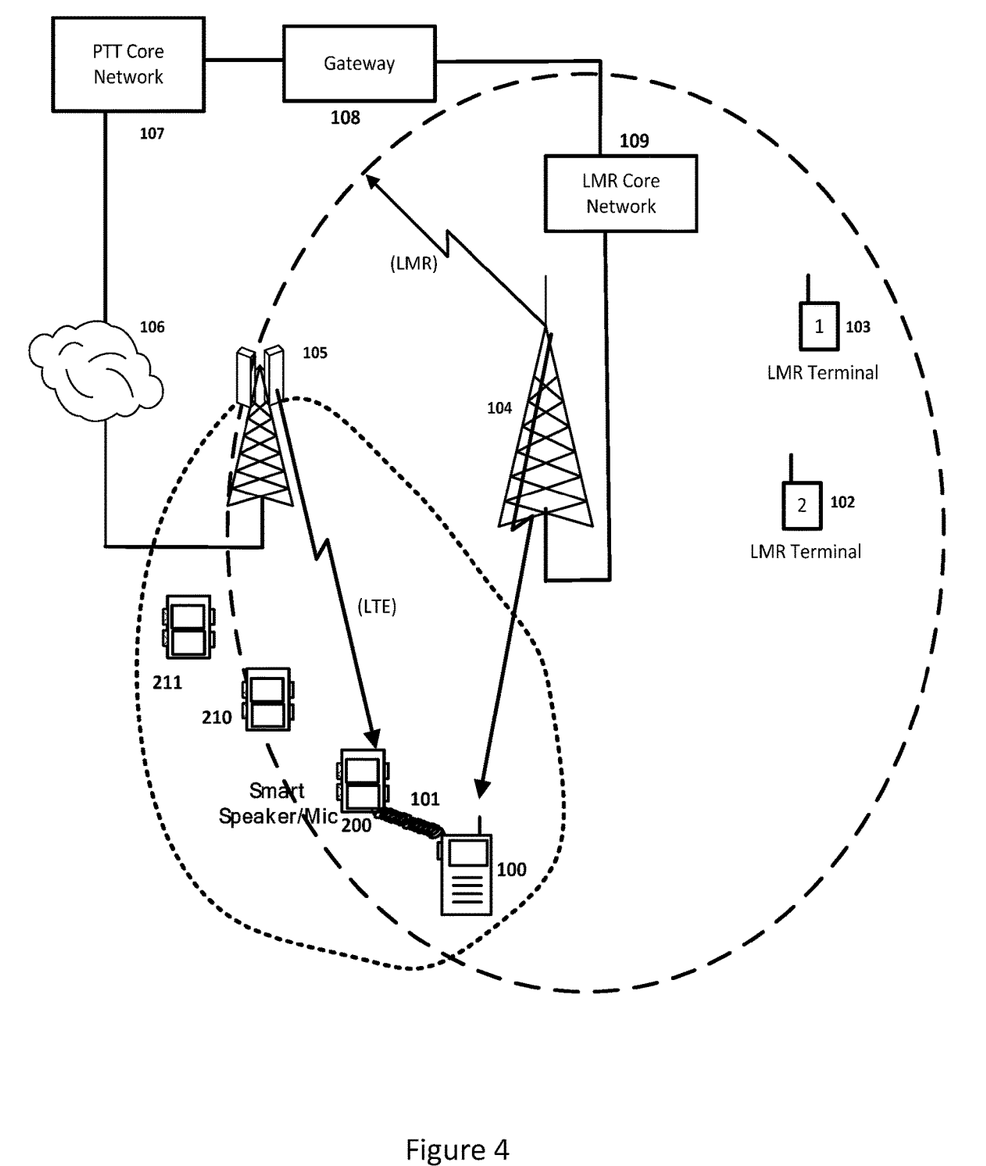
FIG. 4 shows a system overview of an LMR system operating with a cellular system.

FIG. 4 shows an overview of a combined wireless communication system. An LMR core network 109 is connected to one or more LMR communication towers 104 that radiate an LMR signal across the geographic area shown which serves several radio terminals including 102 and 103. FIG. 4 also shows a PTT Core network 107 which offers full duplex voice services, though is also capable of automatically switching to half duplex. This connects to one or more cellular towers through an IP network 106. In this illustration it is assumed the cellular towers are LTE 105 although any cellular technology capable of supporting IP connectivity is sufficient. The LTE towers supply service within the geographic area shown and serve several smart mic devices including 210 and 211.

FIG. 4 also shows a voice gateway 108 between the PTT Core 107 and the LMR Core 109. Also shown is a smart mic 200 connected by a cable 101 to an LMR radio terminal 100. This particular smart mic unit 200 is capable of making calls over either LTE or radio terminal. LMR terminals 102 and 103 and 100 can communicate with each other using the LMR network. Smart mic units 200, 210 and 211 can communicate with each other using the LTE network. In the presence of the gateway 108 then all the devices 100, 102, 103, 200, 210 and 211 can communicate with each other. In the special case of smart mic 200 it can initiate a call on either the LTE network using one button or it can initiate a call on the LMR network using another button. Alternatively it can receive on either LTE or LMR (via the LMR radio terminal).

Figure 5:
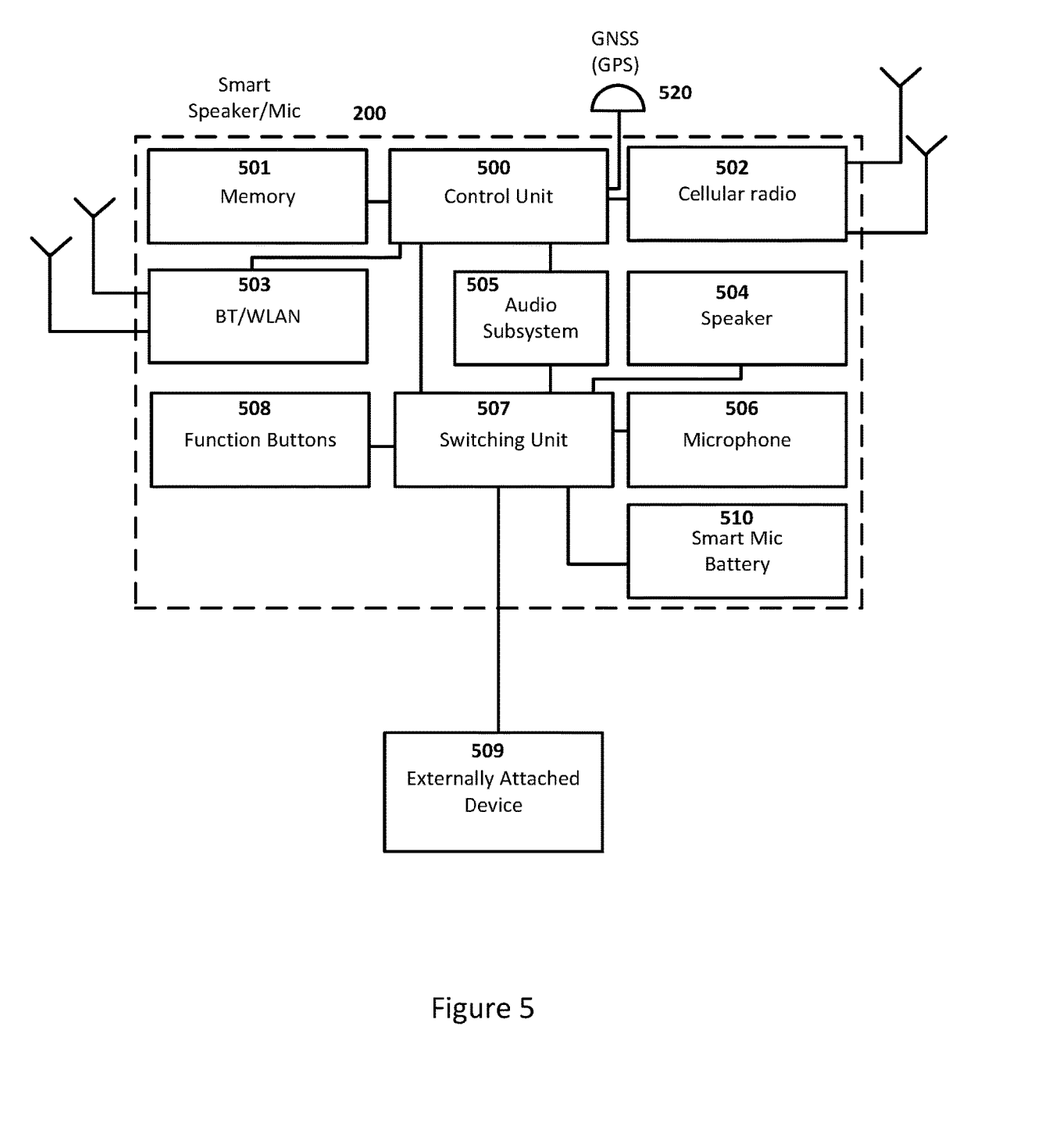
FIG. 5 shows and overview of the smart mic connected to an external radio terminal, FIG. 6 describes a typical LMR system.

FIG. 5 offers a system description of a smart mic 200. The smart mic contains a control unit 500 which is a processor and that implements control and communication functions. The control unit connects to a GPS unit 520 for the purpose of identifying the smart mic location. For convenience the location technology is described as GPS, however all forms of Global Navigation Satellite System (GNSS) are included. The computer programs that implement the algorithms on the platform are contained within local memory 501 and executed on the smart mic. The smart mic contains a cellular radio terminal 502 used for communicating over the cellular network. The cellular radio terminal 502 is connected to the control unit 500. The smart mic also contains a Bluetooth and or Wi-Fi unit 503 used for communicating to local equipment over this medium. The Bluetooth and or Wi-Fi 503 are connected to the control unit 500.

The smart mic also contains one or more microphones 506 and one or more speakers 504 and one or more function buttons 508. These are preferentially connected to the control unit 500 via a switching control unit 507 and/or the audio subsystem 505. Audio subsystem processing may include adjusting audio levels, injecting audio and audio filtering. The smart mic also contains a local power source 510 that in this case is a battery. Also connected to the switching unit is an externally attached device 509 that in this case is an LMR radio terminal. This LMR radio terminal may be a handheld that operates from a battery. Alternatively the LMR radio terminal may be installed in a vehicle. In the LMR industry this is typically referred to as a mobile radio terminal that operates from a vehicle power supply. In an alternative form the smart mic 200 may be physically built into a mobile radio terminal.

Figure 6:
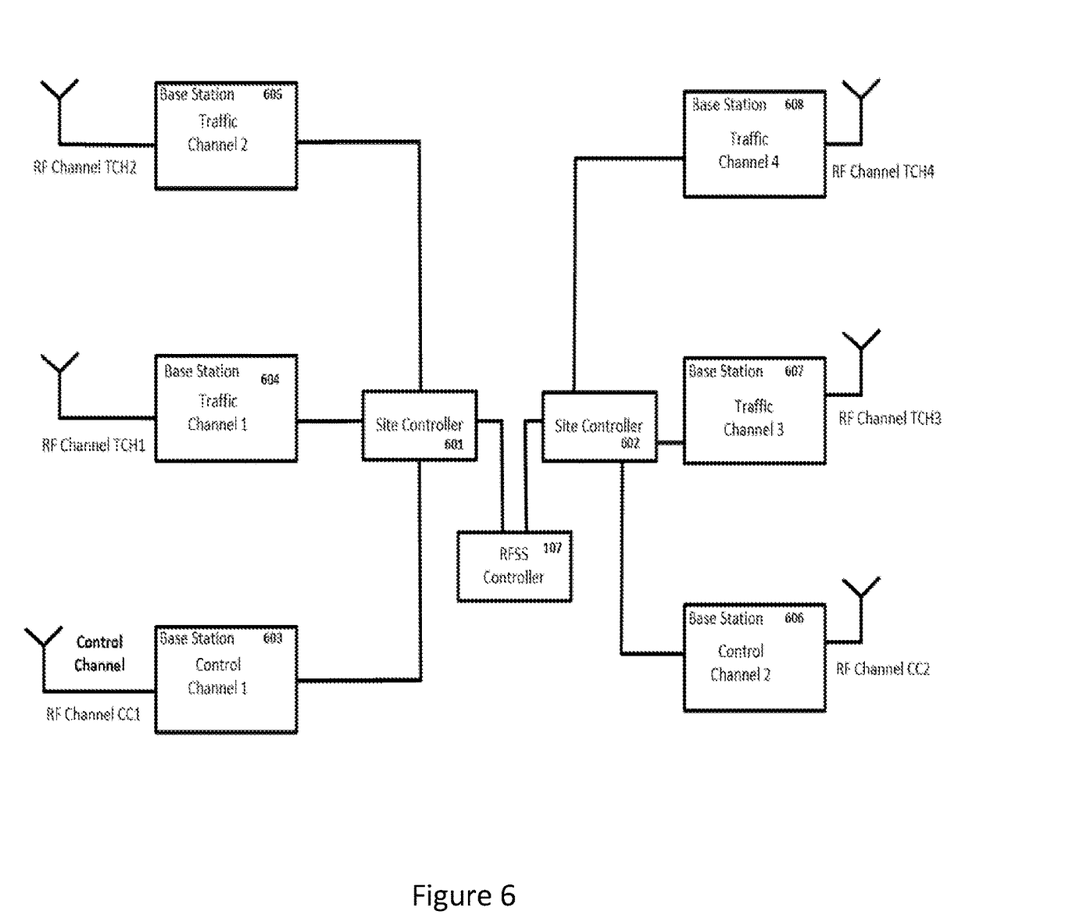

FIG. 6 offers an overview of the components in a typical trunked LMR system. Base station 603 represents a control channel, labelled RF Channel CC1 in a trunked system. Base stations 604 and 605 represent traffic channels, TCH1 and TCH2 that can be allocated using CC1 offered on base station 603. It is typical for a physical site to be managed by a site controller 601. A second site is also shown controlled by site controller 602 which in turn controllers control channel 606 and traffic channels 607 and 608. Each site controller is connected to a LMR trunked controller referred to in P25 as a Radio Frequency Sub System Controller (RFSS Controller). The P25 RFSS Controller 107 is the central point of control in the network.

Figure 7:
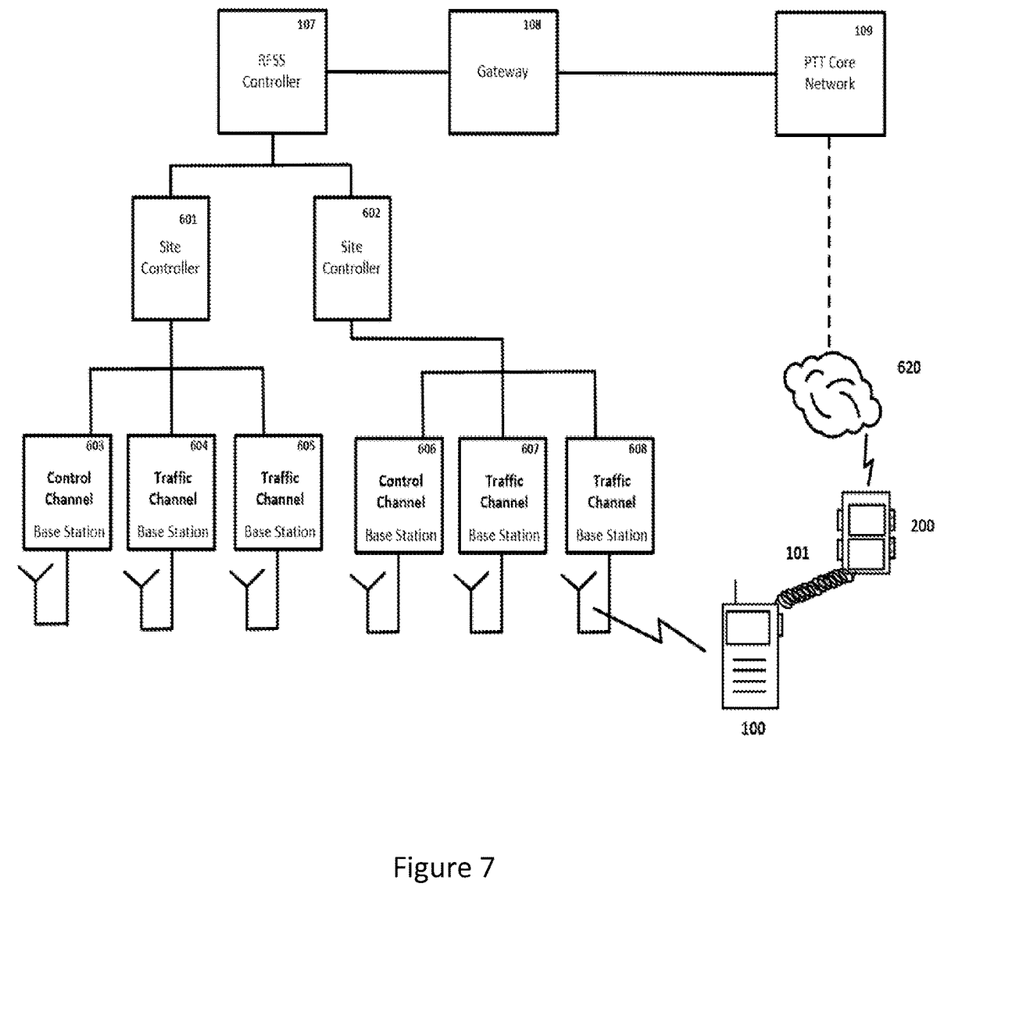
FIG. 7 shows a typical LMR system integrated with a PTT solution.

FIG. 7 describes an architecture according to an embodiment of the invention. Components 107 and 601 to 608 form a physical P25 network made up of a P25 RFSS Controller, 107 and two site controllers 601 and 602 and several base stations 603 to 608; making up two control channels and four traffic channels. The RFSS 107 is connected to a voice gateway 108 for a PTT Core network 109 which offers VOIP services. The PTT Core Network 109 communicates with smart devices via an IP network which in this case is a cellular network 620. Also shown in this figure is the smart mic 200 connected via a cable 101 to an LMR terminal which can operate on the LMR network controlled by the RFSS controller 107.

Figure 8:
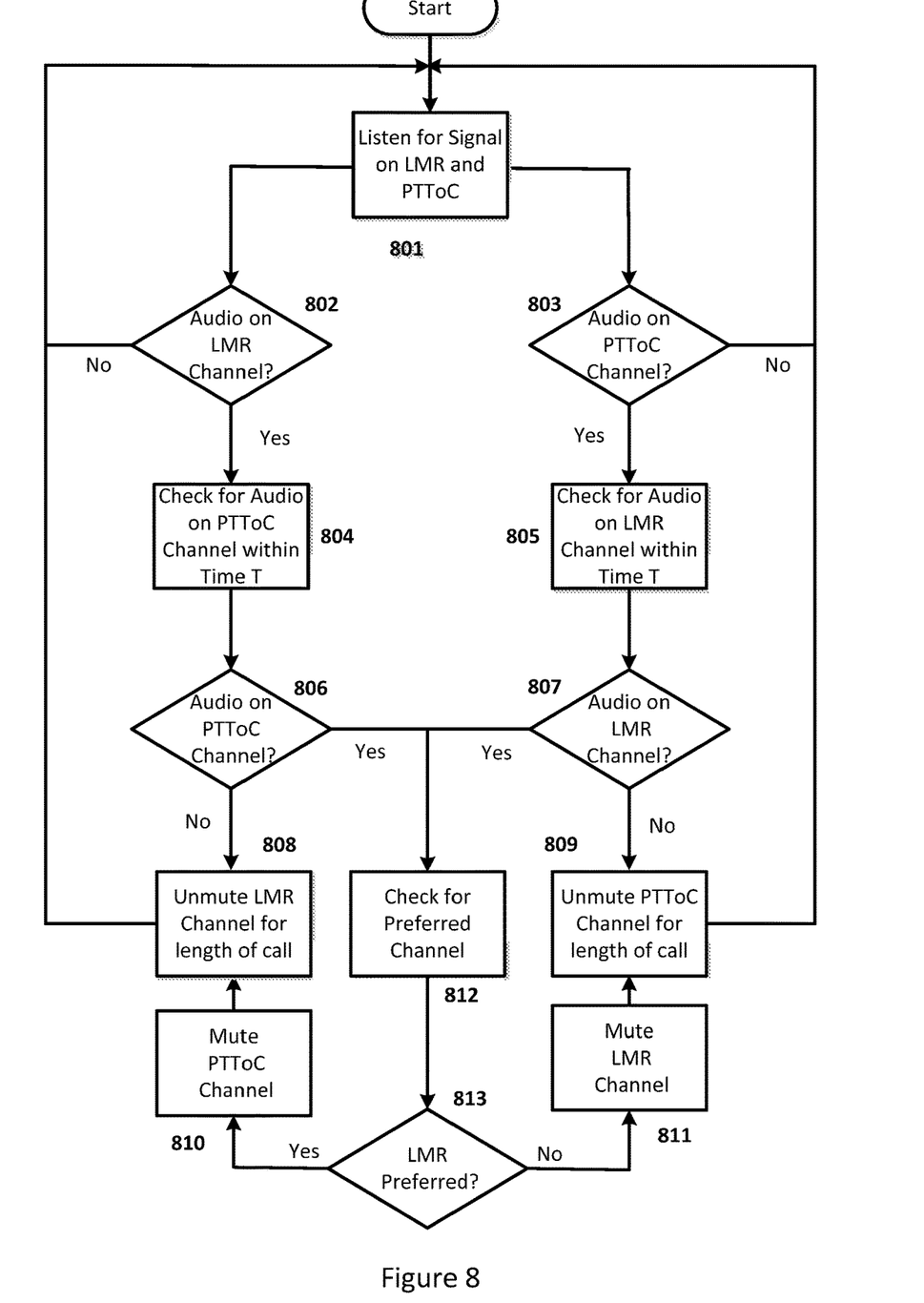
FIG. 8 shows a flow diagram for selecting a preferred bearer upon receipt of a call.

FIG. 8 describes a process that is followed when the same audio signal is received by both the smart mic and the radio terminal at the same time where either the smart mic or the radio terminal is given preference for audio operation for the call. A preference can be set according to operational need or user settings, for example. One example might be to prefer LMR based on cost or power demand of the bearer. This process takes place in either the smart-mic or the radio terminal which communicate with each of other over a wired or wireless connection. The call continues in one device and is discontinued or ignored in the other. Details of respective call setup and establishment over LMR and LTE will be appreciated by a skilled reader.

In step 801 the smart mic and the attached radio terminal are both ready to listen for incoming audio calls over their respective PTToC and LMR channel paths. In step 802 an assessment is made to determine if an audio call has been received or started on the LMR channel. If a call has not arrived then the system returns to step 801 and continues to monitor. If a call has started however then in step 804 a check is made to establish if the same call has also arrived over the PTToC channel. A configurable time period is used for this check, that may be set to a nominal 100 ms. This time period could be configurable per device or system. Once the check is made in step 804 then in step 806 a check is made to see if the audio call has also started or been requested in the PTToC channel. If no PTToC call has arrived, then in step 808 the remainder of the call operates over the LMR channel. If, however, a PTToC call has arrived then in step 812 a check is made to see which of the bearer paths (PTToC or LMR) is preferred for operating this call. In step 813 a check is made to see if LMR is preferred and if it is then in step 810 the PTToC channel is muted and the remainder of the call operates on LMR. In an alternative form the PTToC channel volume is turned down so that the LMR channel is dominant whilst still being able to hear conversation on the PTToC channel in the background. If however LMR is not preferred then in step 811 the LMR channel is muted and the remainder of the call is undertaken in the PTToC channel in step 809. In an alternative form the LMR channel volume is turned down so that the PTToC channel is dominant whilst still being able to hear conversation on LMR in the background.

In parallel with step 802, during step 803, the smart mic checks to see if a PTToC call is starting on the PTToC channel. If a PTToC call has not started then the system returns to step 801 and continues to monitor. If a call has started however, then in step 805 a check is made to establish if the same call has also arrived over the LMR channel. A configurable time period is used for this check that may be set to a nominal 100 ms. Once the check is made in step 805 then in step 807 a check is made to see if the audio call has also arrived in the LMR channel. If no LMR call has arrived then in step 809 the remainder of the call operates over the PTToC channel. If however a PTToC call has arrived then in step 812 a check is made to see which of the paths is preferred and the same process is followed as discussed above.

Figure 9:
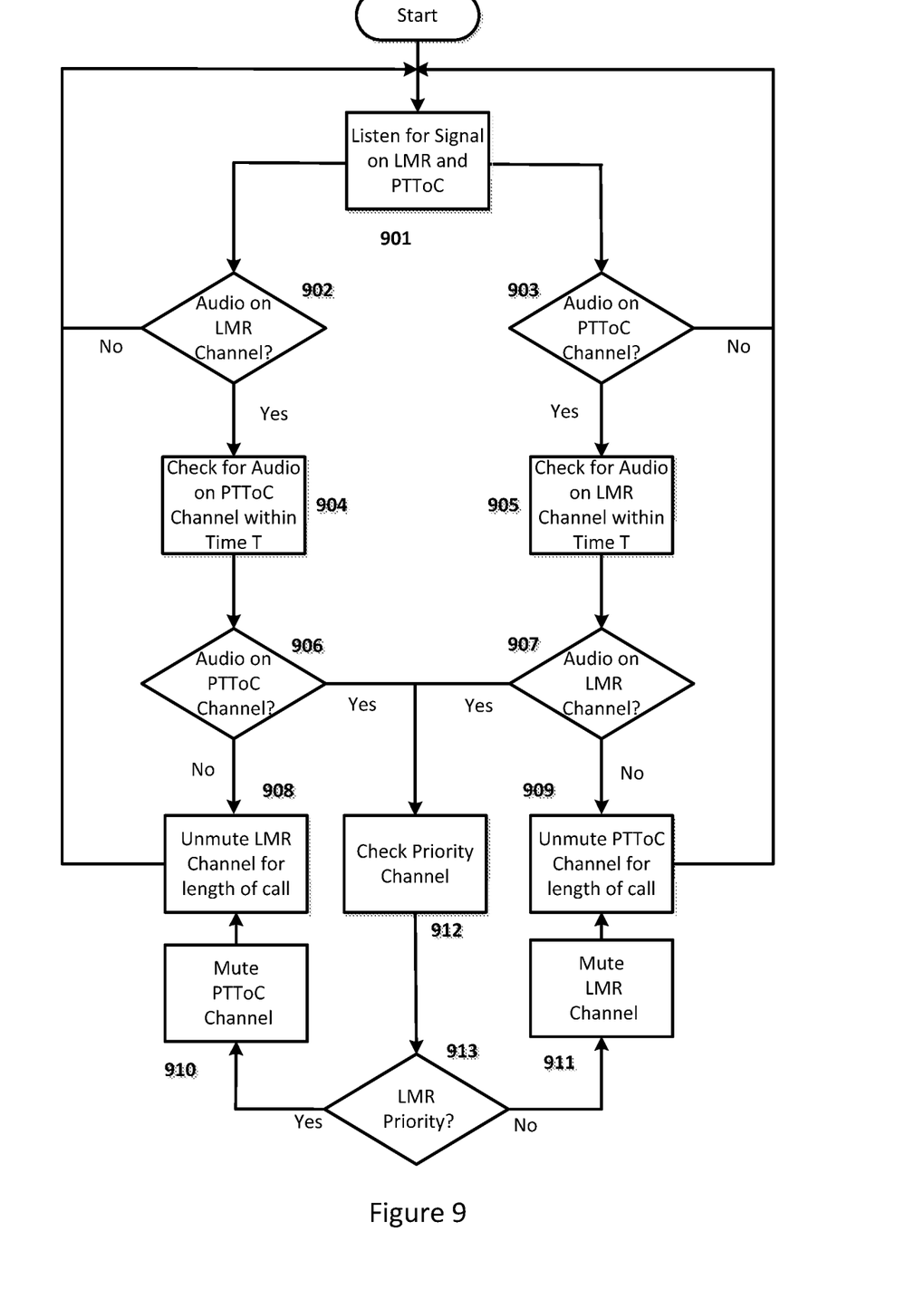
FIG. 9 shows a flow diagram for selecting a priority bearer upon receipt of a call.

FIG. 9 describes the process that is followed when the same audio signal is received by both the smart mic and the radio terminal at the same time where either the smart mic or the radio terminal is preferred because of priority for audio operation for the call. Priority is a special form of preference in that a system may be configured such that that all calls from the LMR system have a priority over all calls on PTToC. This operation decision may be made because all front line operations are configured on LMR whereas all non essential users are deployed on PTToC.

In step 901 the smart mic and the attached radio terminal are both ready to listen for incoming audio calls over their respective PTToC and LMR channel paths. In step 902 an assessment is made to establish if an audio call has started on the LMR channel. If a call has not started then the system returns to step 901 and continues to monitor. If a call has started, however, then in step 904 a check is made to establish if the same call has also arrived over the PTToC channel. A configurable time period is used for this check that may be set to a nominal 100 ms. Once the check is made in step 904 then in step 906 a check is made to see if the audio call has also arrived in the PTToC channel. If no PTToC call has arrived then in step 908 the remainder of the call operates over the LMR channel. If however a PTToC call has arrived then in step 912 a check is made to see which of the bearer paths (PTToC or LMR) has priority for operating this call. In step 913 a check is made to see if LMR is priority and if it is then in step 910 the PTToC channel is muted and the remainder of the call operates on LMR. If, however, LMR is not priority then in step 911 the LMR channel is muted and the remainder of the call is undertaken in the PTToC channel in step 909.

In parallel with step 902, during step 903, the smart mic checks to see if a PTToC call is starting on the PTToC channel. If a PTToC call has not started then the system returns to step 901 and continues to monitor. If a call has started however then in step 905 a check is made to establish if the same call has also arrived over the LMR channel. A configurable time period is used for this check that may be set to a nominal 100 ms. Once the check is made in step 905 then in step 907 a check is made to see if the audio call has also arrived in the LMR channel. If no LMR call has arrived then in step 909 the remainder of the call operates over the PTToC channel. If, however, a PTToC call has arrived then in step 912 a check is made to see which of the paths has priority and the same process is followed as discussed above.

Figure 10:
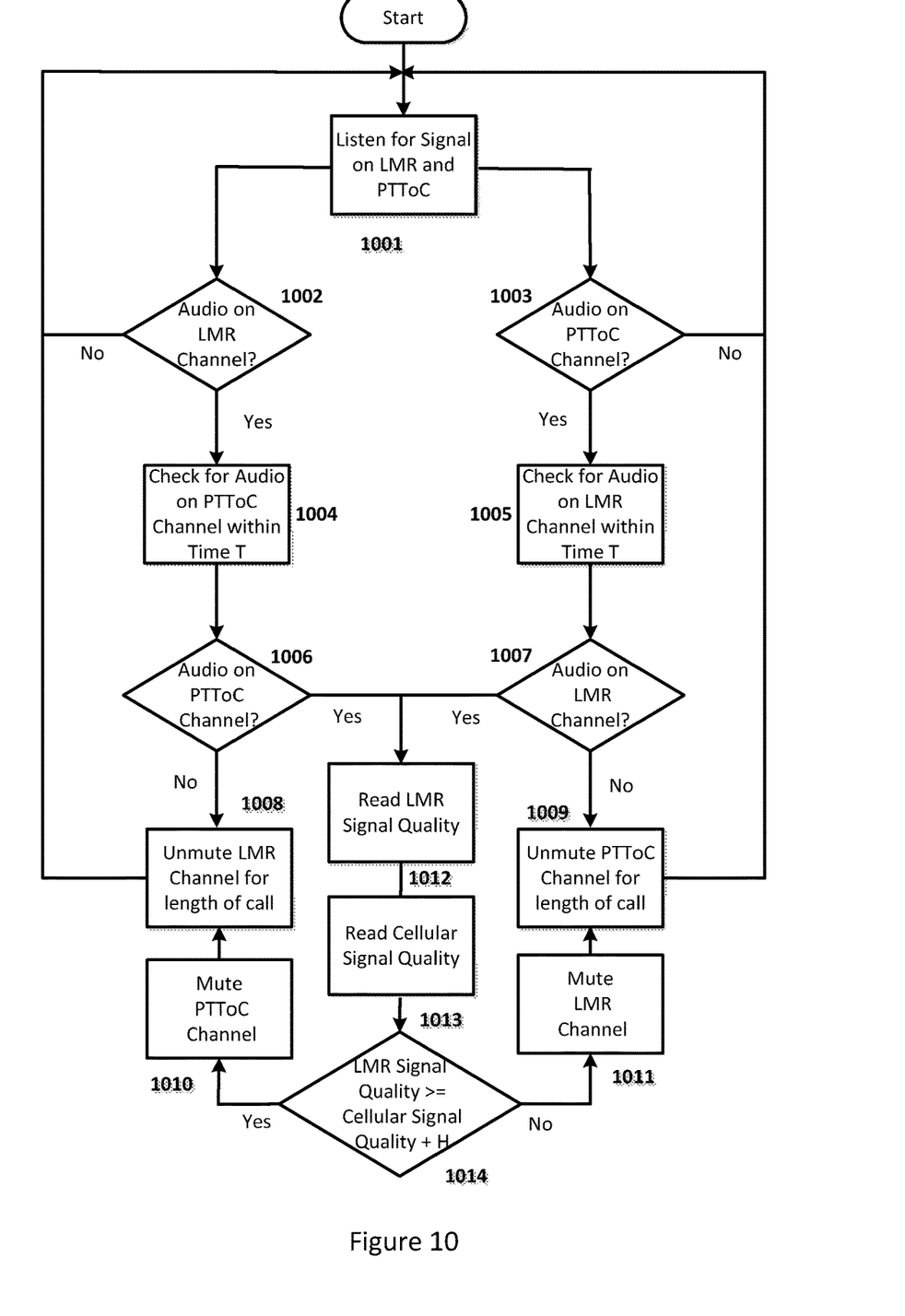
FIG. 10 shows a flow diagram for selecting a bearer based on signal quality upon receipt of a call.

FIG. 10 describe the process followed when the same audio signal is received by both the smart mic and the radio terminal at the same time where either the smart mic or the radio terminal can take precedence over its connected radio terminal or smart mic based on which receives better audio signal quality. The signal quality must be equal to or greater than a value H where H represents a hysteresis which avoids the device rapidly switching between the two bearers. A typical value might be 5 dB.

In step 1001 the smart mic and the attached radio terminal are both ready to listen for incoming audio signals over their respective PTToC and LMR channel paths. Where the radio terminal is receiving audio, in step 1002, the radio terminal simultaneously checks for audio signals being directed to the smart mic in step 1004. In step 1006, the radio terminal determines whether an audio signal is being directed to the smart mic. If an audio signal is not found being directed to the smart mic, the radio terminal is unmuted for the duration of the audio transmission, in step 1008 and thereafter returns to listening for incoming audio signals. If an audio signal is found being directed to the smart mic, the radio terminal checks the signal quality of the radio terminal, in step 1012, and the signal quality of the smart mic, in step 1013. In step 1014, the radio terminal determines whether the smart mic or the radio terminal has the better signal quality. If the radio terminal is found to have the better signal quality, the smart mic is muted in step 1010 and the radio terminal is unmuted for the duration of the audio transmission in step 1008. If the smart mic is found to have the better signal quality, the radio terminal is muted in step 1011 and the smart mic is unmuted for the duration of the audio transmission in step 1009.

Where the smart mic is transmitting audio, in step 1003, the smart mic simultaneously checks for audio signals being directed to the radio terminal in step 1005. In step 1007, the smart mic determines whether an audio signal is being directed to the radio terminal. If an audio signal is not found being directed to the radio terminal, the smart mic is unmuted for the duration of the audio transmission, in step 1009, and thereafter returns to listening for incoming audio signals. If an audio signal is found being directed to the radio terminal, the smart mic checks the signal quality of the radio terminal, in step 1012, and the signal quality of the smart mic, in step 1013. In step 1014, the smart mic determines whether the smart mic or the radio terminal has the better signal quality. If the radio terminal is found to have the better signal quality, the smart mic is muted in step 1010 and the radio terminal is unmuted for the duration of the audio transmission in step 1008. If the smart mic is found to have the better signal quality, the radio terminal is muted in step 1011 and the smart mic is unmuted for the duration of the audio transmission in step 1009.

Figure 11:
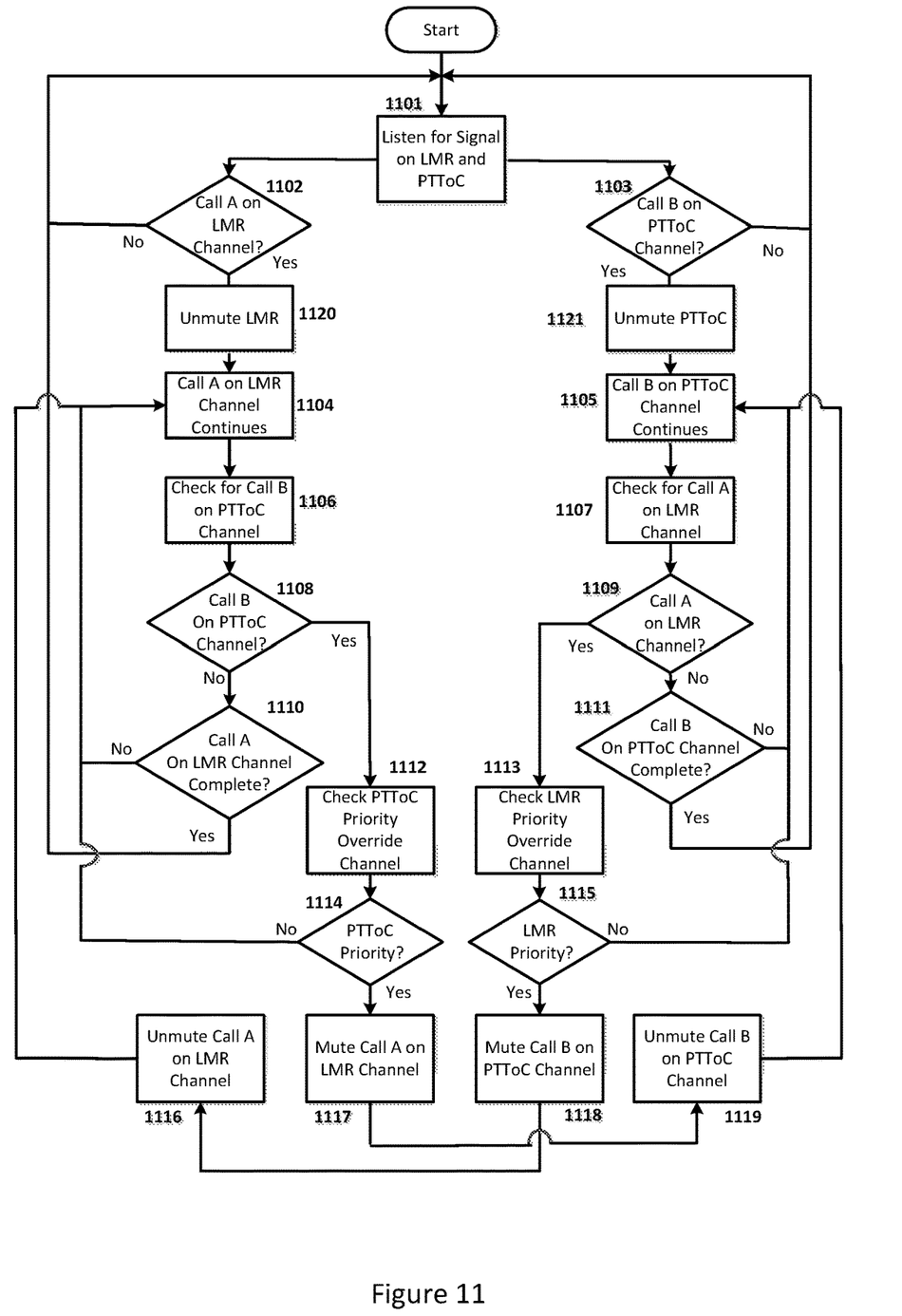
FIG. 11 shows a flow diagram for over riding an existing call on a particular bearer based on the priority of the call.

FIG. 11 illustrates the process when a call is operating on either the LMR channel or the PTToC channel and during that call then another call comes in on the other bearer. A preference process is again carried out. In step 1101 the smart mic and the attached radio terminal are both ready to listen for incoming audio call over their respective PTToC and LMR channel paths. In step 1102 the radio terminal checks to see if a call A has started on the LMR channel. If no call has started then the system returns to step 1101 to continue listening for a call start. If however a call has arrived then in step 1120 the call is started on the LMR channel and the LMR audio is unmuted. In step 1104 then call A continues on the LMR channel. In step 1106 a check is made to see if a call has started on the PTToC channel. In step 1108, if no call has started in the PTToC channel then call A continues on the LMR channel. In step 1110 a check is made to see if the LMR call has finished and if it has then the system returns to step 1101 but if it has not finished then the call continues in step 1104 before further checks are made for other incoming calls in the PTToC channel.

In step 1108, if a call has started on the PTToC channel then in step 1112 a check is made to see which of the bearers LMR or PTToC has priority. In step 1114, if PTToC does not have priority over LMR then in step 1104 the call continues. If in step 1114 the PTToC channel does have priority over LMR then in step 1117, call A is muted on the LMR channel and in step 1119 the PTToC call B starts on the PTToC channel.

In step 1103 the smart mic checks to see if a call B has started on the PTToC channel. If no call has started then the system returns to step 1101 to continue listening for a call start. If, however, a call has arrived then in step 1121 the call is started on the PTToC channel and the PTToC audio is unmuted. In step 1105 call B continues on the PTToC channel. In step 1109 a check is made to see if a call has started on the LMR channel. In step 1109, if no call has started in the LMR channel then call B continues on the PTToC channel. In step 1111 a check is made to see if the PTToC call B has finished and if it has then the system returns to step 1101 but if it has not finished then the call continues in step 1105 before further checks are made for other incoming calls in the LMR channel.

In step 1109, if a call has started on the LMR channel then in step 1113 a check is made to see which of the bearers LMR or PTToC has priority. In step 1115, if LMR does not have priority over PTToC then in step 1105 the call continues. If in step 1115 the LMR channel does have priority over PTToC then in step 1118, call B is muted on the PTToC channel and in step 1116 the LMR call A starts on the LMR channel.

Figure 12:
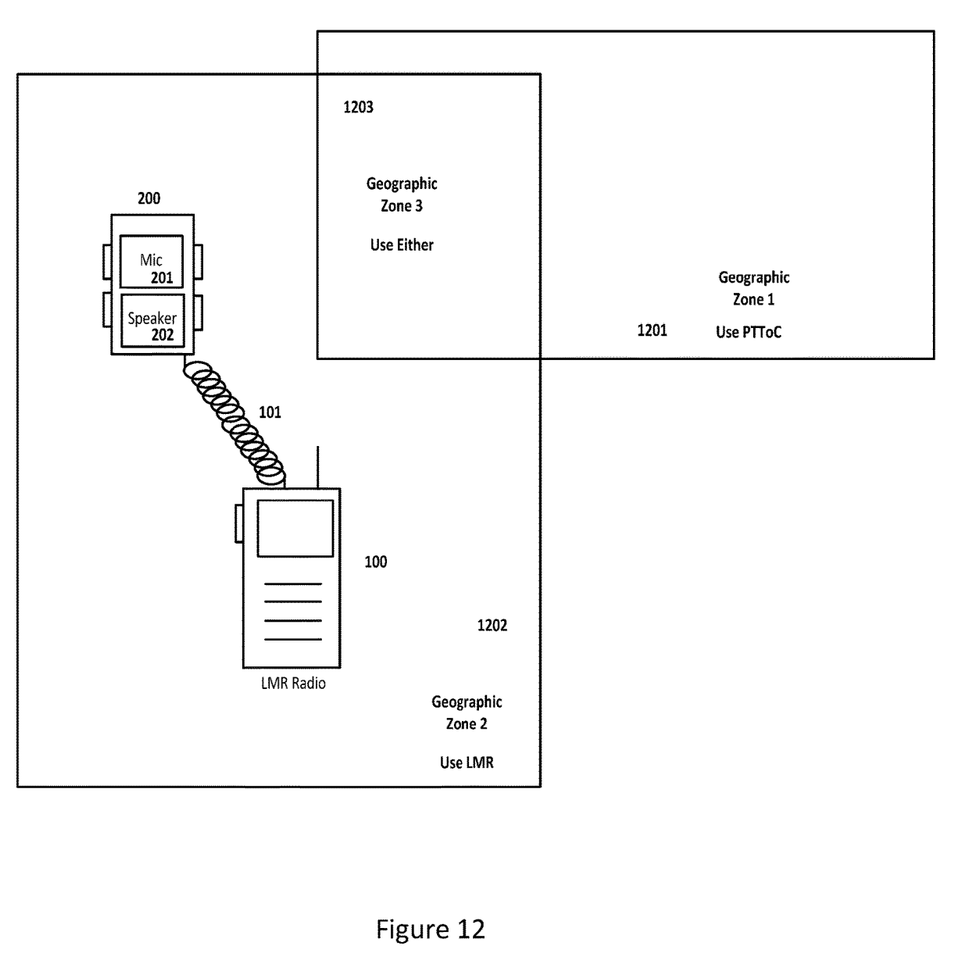
FIG. 12 illustrates how the selection of bearer to use for a call may be based on geographic zones.

FIG. 12 illustrates how the choice of bearer for a call may be defined based on the geographic area that the combined LMR/PTToC terminal is presently in. In this example three geographic areas are shown. 1201 is an area in which the use of PTToC is preferred. 1202 is an area in which LMR is preferred and in the geographic zone 1203 then either LMR or PTToC can be used.

Figure 13:
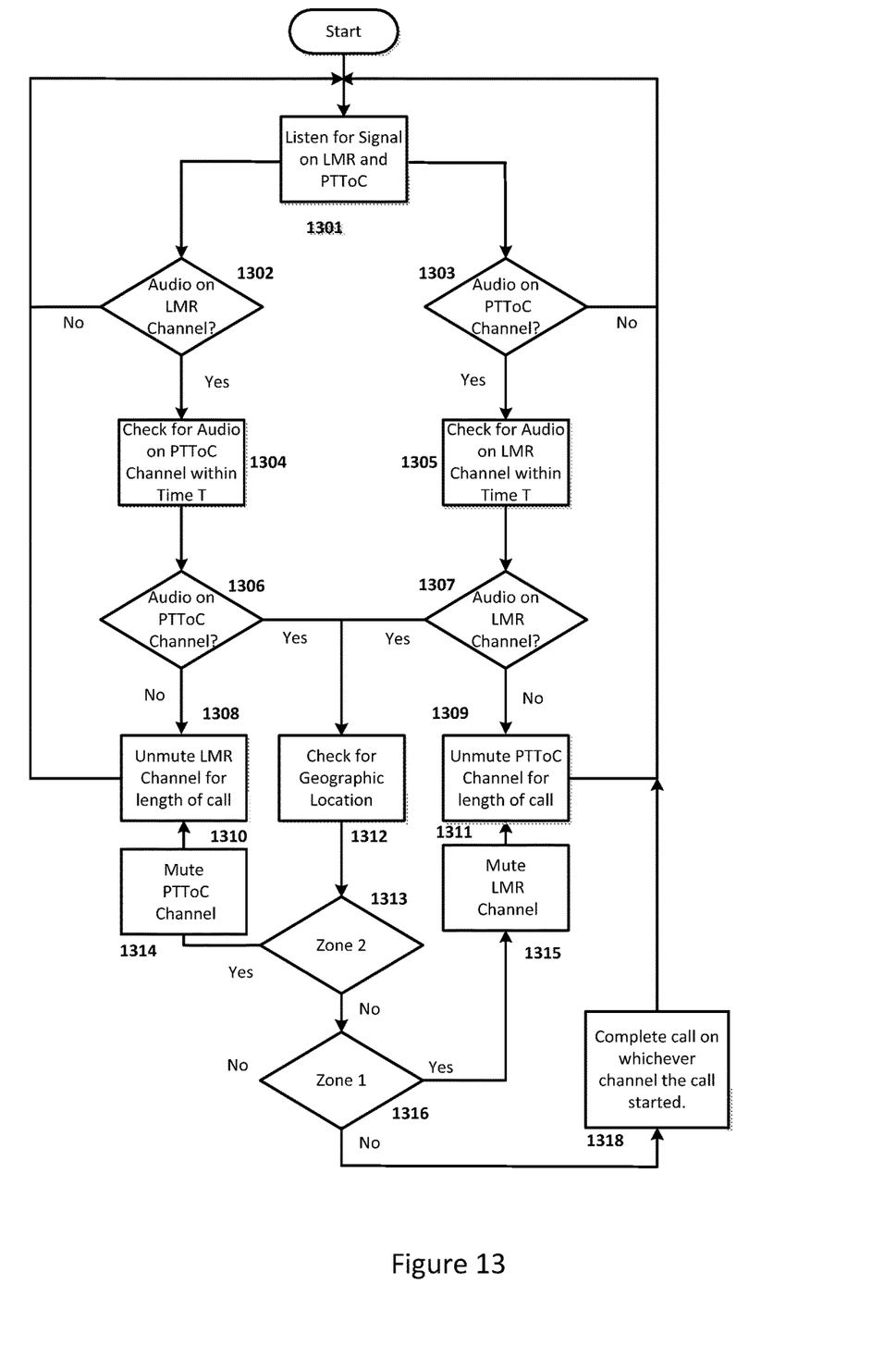
FIG. 13 shows a flow diagram for the selection of bearer to use for a call based on geographic zones.

FIG. 13 describes the process followed when a call is established according to the geographic zones illustrated in FIG. 12. In step 1301 the LMR/PTToC device is listening for the start of a call over either the LMR channel or the PTToC channel. In step 1302, a check is made to see if an audio call has started in the LMR channel. If no call has started then the system returns to step 1301 and continues to listen for a call start. If a call has started however then in step 1304 a check is made to establish if the same call has also arrived over the PTToC channel. A configurable time period is used for this check that may be set to a nominal 100 ms.

Once the check is made in step 1304 then in step 1306 a check is made to see if the audio call has also arrived in the PTToC channel. If no PTToC call has arrived then in step 1308 the remainder of the call operates over the LMR channel. If however a PTToC call has arrived then in step 1312 a check is made to see which geographic zone the device is in through reading the GPS location on the device and comparing that against predefined geographic zones. In step 1313 a check is made to see if the system is in Zone 2 which means LMR is preferred. If it is in Zone 2 then in step 1314 the PTToC channel is muted and the remainder of the call operates on LMR is step 1310. If the device is not in Zone 2 then in step 1316 a check is made to see if the device is in Zone 1 where PTToC is preferred. If it is in zone 1 then in step 1318 either channel can be used in which case the call operates on which ever channel the call started on first and the other channel is muted.

In parallel with step 1301, during step 1303, the smart mic checks to see if a PTToC call is starting on the PTToC channel. If a PTToC call has not started then the system returns to step 1301 and continues to monitor. If a call has started however then in step 1305 a check is made to establish if the same call has also arrived over the LMR channel. A configurable time period is used for this check that may be set to a nominal 100 ms. Once the check is made in step 905 then in step 1307 a check is made to see if the audio call has also arrived in the LMR channel. If no LMR call has arrived then in step 1309 the remainder of the call operates over the PTToC channel. If however a PTToC call has arrived then in step 1312 a check is made to see which geographic zone the device is in as discussed above.

The invention claimed is:

1. A method of operating a combined cellular smart-mic and LMR radio terminal comprising:
   receiving a voice call on the cellular bearer,
   receiving a same call on the LMR bearer,
   determining, at the smart-mic, or the terminal, if the cellular bearer or the LMR bearer is preferred when receiving the same call on different bearers, and
   continuing with the call on the preferred bearer only using the smart mic, or the LMR radio terminal, and
   discontinuing the same call on the non-preferred bearer.

2. The method according to claim 1, further comprising discontinuing the call on the non-preferred bearer by muting, disabling, or ending the call on the non-preferred bearer.

3. The method according to claim 1, wherein the preferred bearer for the call is determined by signal quality, user location, network priority, or user settings.

4. A smart mic for combination with an LMR radio terminal, comprising:
   a processor and memory,
   a cellular radio for communication with a wireless network using a cellular bearer, and
   a speaker and microphone which provide for audio output and input during calls,
   wherein the memory contains instructions which cause the processor to:
   receive a call on the cellular bearer,
   determine when a same call has also been received by the LMR radio terminal on an LMR bearer,
   determine whether the cellular bearer, or the LMR bearer, is preferred when receiving the same call on different bearers,
   continue with the call on the preferred bearer using the smart mic or LMR terminal, and
   discontinue the same call on the non-preferred bearer.

5. The smart mic according to claim 4, wherein the instructions further cause the processor to: discontinue the call on the non-preferred bearer by muting, disabling, or ending the call on the non-preferred bearer.

6. The smart mic according to claim 4, wherein the preferred bearer for the call is determined by signal quality, user location, network priority, or user settings.

7. The smart mic according to claim 4, wherein the smart mic communicates with the LMR radio terminal by a wired connection, or by a wireless connection.

8. The smart mic according to claim 4, wherein the memory contains instructions for a PTToC (Push To Talk over Cellular) application which implements a half-duplex call over the cellular bearer.

9. The smart mic according to claim 4, wherein the cellular bearer is LTE.

* * * * *